United States Patent [19]

Kennedy

[11] Patent Number: 4,715,868
[45] Date of Patent: Dec. 29, 1987

[54] VAPOR RECOVERY SYSTEM

[75] Inventor: Paul E. Kennedy, Tulsa, Okla.

[73] Assignee: McGill Incorporated, Tulsa, Okla.

[21] Appl. No.: 909,969

[22] Filed: Sep. 22, 1986

Related U.S. Application Data

[63] Continuation-in-part of Ser. No. 751,329, Jul. 1, 1985, Pat. No. 4,670,028.

[51] Int. Cl.$^4$ ............................................. B01D 53/14
[52] U.S. Cl. ...................................................... 55/48; 55/58; 55/62; 55/88; 55/179
[58] Field of Search ...................................... 55/48–51, 55/55, 58, 62, 88, 179, 180, 208

[56] References Cited

U.S. PATENT DOCUMENTS

| | | | |
|---|---|---|---|
| 3,877,893 | 4/1975 | Sweny et al. | 55/48 |
| 4,066,423 | 1/1978 | McGill et al. | 55/48 |
| 4,261,716 | 4/1981 | Schwartz et al. | 55/179 X |
| 4,276,058 | 6/1981 | Dinsmore | 55/48 |
| 4,462,811 | 7/1984 | Dinsmore et al. | 55/48 X |

*Primary Examiner*—Charles Hart
*Attorney, Agent, or Firm*—Bill D. McCarthy

[57] ABSTRACT

A process for the recovery of hydrocarbon vapors from an air-hydrocarbon mixture wherein the inlet air-hydrocarbon mixture is passed to an absorber vessel in which is fed a vacuum flashed liquid hydrocarbon absorbent to produce an absorber overhead gas stream which is passed to a solid absorbent bed. Once saturated, the adsorbed hydrocarbon on the solid adsorbent bed is removed by liquid vacuum pump regeneration, separated from the pump liquid, and returned to the system for use. Hydrocarbon free air is vented from the solid adsorbent bed during the adsorption mode.

23 Claims, 4 Drawing Figures

VAPOR RECOVERY SYSTEM

CROSS REFERENCE TO RELATED APPLICATION

This application is a continuation-in-part application of co-pending patent application, U.S. Ser. No. 751,329, U.S. Pat. No. 4,670,028 entitled "ABSORPTION-ADSORPTION-ABSORPTION VAPOR RECOVERY SYSTEM", filed July 1, 1985, said referenced application expressly incorporated herein by reference.

BACKGROUND OF THE INVENTION

1. Field of the Invention the present invention relates generally to the field of hydrocarbon removal and recovery from air-hydrocarbon mixtures, and more particularly but not by way of limitation, to processes for the effective and economical removal of hydrocarbon components from mixtures of air-gasoline vapors.

2. Discussion of the Prior Art

The earliest known installation in the United States of a vapor recovery system for gasoline vapors was a unit which incorporated a process combining compression and condensation. This early vapor recovery system was installed in the late 1920's on a gasoline storage tank, and while several commercial entities marketed vapor compression systems for storage tanks in the years following that initial installation, it wasn't until the late 1950's that vapor recovery systems were installed at truck loading terminals in this Country to meet local air pollution regulations which severely limited levels of hydrocarbon emissions. These systems also practiced compression-condensation processes.

Nationally, "clean air" legislation activity began to garner serious attention in the late 1960's, culminating in the Clean Air Act of 1968. This of course brought nationwide attention to gasoline vapor recovery and a marketing demand was immediately created to be filled by a host of manufacturers offering a variety of vapor recovery systems. With the exception of a lean oil/absorption system marketed by one such company, these systems were simply variations of the earlier compression-condensation units that were first installed for vapor recovery on storage tanks. The lean oil/absorption systems dominated the market until experience indicated that such units did not perform economically, even though theoretical design characteristics were favorable.

Cryogenic refrigeration systems began gaining market acceptance in the early 1970's as such vapor recovery units proved to be the more reliable of available systems. However, these units had high horsepower requirements, and required relatively high upkeep attention and expense. While meeting air pollution regulations of that era, the cryogenic units were, in general, not cost effective as such units represented an added cost of doing business.

An adsorption/absorption vapor recovery system was taught in U.S. Pat. No. 4,006,423, issued to McGill et. al. in January, 1978. This system represented a very large reduction in operating costs over the cryogenic units, for example, requiring only about ten percent (10%) of the connected horsepower of comparable cryogenic units. Further, the McGill et. al. vapor recovery system represented cost savings as the value of the gasoline recovered by these units provided a respectable return on investment. Furthermore, these units have enjoyed a very favorable history of lower maintenance costs. Consequently, various adsorption-/absorption systems generally filled the market requirements during the late 1970's as truck loading terminals installed mandated emission control systems.

The trend of governmental regulations, implementing the Clean Air Act of 1968 and related laws, has been toward ever stricter standards and stricter interpretation of existing ones. Meanwhile, developments in the petroleum industry have increased the amount of gasoline vapors which must be processed by the vapor recovery equipment at loading stations. This latter phenomenon has been brought about chiefly by the elimination of lead constituents in motor fuels, the consequent increase in aromatic makeup of such fuels, and the increase of gasoline vapor pressures.

Due to difficulties encountered with uniform interpretation of regulations requiring the reduction of hydrocarbon emissions as a percent of the discharge vapor load, there has developed a trend toward specifying the amount of permissible hydrocarbon emissions in absolute values, that is, the rating of permissible emission levels in terms of weight/volume loaded, usually in milligrams of hydrocarbon per liter of liquid product loaded (and often calculated as gasoline equivalent for heavy liquids such as diesel product). As bottom truck loading became more prominent, with its accompanying leakage control difficulties, this approach to emission limitation was greatly resisted but has gained support as truck leakage has been greatly reduced. Currently, federal regulations require that total hydrocarbon emission be limited to less than 35 mg/liter in most parts of this country, and that trucks be periodically leak tested.

Of the vapor recovery systems presently in operation at truck loading sites in the United States, approximately sevety-five percent (75%) of same are either of the adsorption/absorption type taught in the above-mentioned McGill et. al. patent or of the cryogenic refrigeration design. Most of these vapor recovery systems were installed sufficiently far back in time that they no longer are adequately sized for their service locations. As noted, the amounts of vapor loading have increased, both due to the changed gasoline makeup and the reduction of vapor bypassing due to truck leakage, and the permitted emission limits have stretched the service loading to the point of exceeding capability in many cases. As a consequence, many truck terminals, faced with large capital expenditures for updating facilities, have simply been closed or consolidated with other such loading stations.

These circumstances have intensified the need for more cost effective vapor recovery systems. More particularly, there has arisen the need for a means to increase the capacity of existing adsorption/absorption recovery systems of the type taught in the afore-mentioned McGill et. al. Patent since these units, or variations of same, comprise the majority of vapor recovery units that are serving truck loading stations in this Country.

While the situation above described has dealt with gasoline vapor recovery in the United States, similar circumstances can be found throughout the free world as global attention has paralleled the development of clean air controls in this Country. An international mandate for hydrocarbon emission abatement has developed rapidly over the last few years.

SUMMARY OF THE INVENTION

The present invention provides an improved process for the recovery of hydrocarbon components from air-hydrocarbon mixtures, and it is especially useful in the recovery of gasoline vapors expelled as a result of storage breathing or as a result of gasoline transfer to vented vessels, such as gasoline trucks.

In the embodiment illustrated by FIG. 1, an inlet air-gasoline vapor mixture is passed through a first absorber and contacted with a vacuum flashed liquid gasoline absorbent to produce a first absorber overhead gas containing the nonabsorbed hydrocarbon components and air. While the bottom liquid of the first absorber is passed to a flash vessel for regenerating the vacuum flashed liquid gasoline absorbent, the first absorber overhead gas is passed to a first solid adsorbent bed to adsorb the hydrocarbon components and to vent substantially hydrocarbon free air to the atmosphere.

Upon saturation of the first solid adsorbent bed, a second solid adsorbent bed is placed on stream and the first solid adsorbent bed is vacuum regenerated with a liquid ring vacuum pump, whereupon a rich air-hydrocarbon mixture is produced. After separation of the vacuum pump seal fluid, the air-hydrocarbon stream from the adsorber is passed through a second absorber and contacted with fresh liquid gasoline absorbent from storage or the like in sufficiently high L/V ratio to produce a constant composition second absorber overhead gas which passes from the second absorber to be combined with the inlet air-gasoline vapor mixture stream passing to the first absorber. Absorber bottom liquid from the second absorber is passed to a selected destination, which is usually a gasoline storage tank.

In the embodiment illustrated by FIG. 2, an inlet air-gasoline vapor mixture is passed through a first absorber vessel counter current to a flashed gasoline liquid stream to produce a first absorber overhead gas stream and a first absorber bottom liquid stream. While the bottom liquid of the first absorber vessel is passed to a flash vessel for producing the vacuum flashed liquid gasoline absorbent, the first absorber overhead gas stream is passed to a first solid adsorbent vessel to adsorb the hydrocarbon components and to vent substantially hydrocarbon free air to the atmosphere.

The flashed liquid stream from the flash vessel is passed to the first absorber vessel such that the inlet air-hydrocarbon mixture is directed through the first absorber vessel in direct countercurrent contact with the downwardly cascading liquid stream. The overhead flashed vapor stream from the flash vessel is passed to a second absorber vessel such that the overhead flashed vapor stream is directed through the second absorber vessel in direct countercurrent contact with a downwardly cascading absorbent stream having an affinity to absorb hydrocarbons from the overhead flashed vapor stream. The overhead gas streams from the first and second absorber vessels are passed to the solid adsorbent beds for adsorbing substantially all of the hydrocarbon components in the first and second absorber overhead gas streams, and at least a portion of the bottom liquid stream of the second absorber vessel is recycled to the second absorber vessel as the absorbent stream.

Upon saturation of the first solid adsorbent bed, a second solid adsorbent bed is placed on stream and the first solid adsorbent bed is vacuum regenerated with a liquid ring vacuum pump, whereupon a rich air-hydrocarbon mixture is produced. After separation of the vacuum pump seal fluid the air-hydrocarbon stream from the adsorber is combined with the air-hydrocarbon stream recovered from the flash vessel and introduced into the second absorber vessel. Liquid hydrocarbons recovered are combined with the liquid hydrocarbons recovered from the flash vessel and combined for use as absorbent in the second absorber vessel.

In the embodiment illustrated in FIG. 3 an inlet air-gasoline vapor mixture is passed through an absorber vessel and contacted with a vacuum flashed liquid gasoline absorbent to produce an overhead gas containing nonabsorbed hydrocarbon components and air. While the bottom liquid of the absorber vessel is passed to a flash vessel for regenerating the vacuum flashed liquid gasoline absorbent the overhead gas from the absorber vessel is passed to a first solid adsorbent bed to adsorb the hydrocarbon components and to vent substantially hydrocarbon free air to the atmosphere. The flashed liquid stream from the flash vessel is passed to the absorber vessel such that the inlet air-gasoline stream is in direct countercurrent contact with the downwardly cascading flashed liquid stream.

Upon saturation of the first solid adsorbent bed, a second solid adsorbent bed is placed on stream and the first solid adsorbent bed is vacuum regenerated with a liquid ring vacuum pump, whereupon a rich air-hydrocarbon mixture is produced. After separation of the vacuum pump seal fluid, the air-hydrocarbon stream from the adsorber is passed through the absorber vessel in direct countercurrent contact with the downwardly cascading flashed liquid stream.

In the embodiment illustrated by FIG. 4 an inlet air-gasoline vapor mixture is compressed, passed to an absorber vessel and contacted with a flashed liquid gasoline absorbent to produce an overhead gas stream containing the nonabsorbed hydrocarbon components and air. While the bottom liquid of the absorber vessel is passed to a flash vessel for regenerating the flashed liquid gasoline absorbent, the overhead gas stream is passed to a first solid adsorbent bed to adsorb the hydrocarbon components and to vent substantially hydrocarbon free air to the atmosphere.

Upon saturation of the first solid adsorbent bed, a second solid adsorbent bed is placed on stream and the first solid adsorbent bed is vacuum regenerated with a liquid ring vacuum pump, whereupon a rich air-hydrocarbon mixture is produced. After separation of the vacuum pump seal fluid, the air-hydrocarbon stream from the adsorber is combined with the inlet air-gasoline mixture for compression.

An object of the present invention is to provide an improved vapor recovery system for the removal and recovery of hydrocarbons, such as gasoline, from an air-hydrocarbon mixture in order to discharge substantially hydrocarbon free air safely to the atmosphere in compliance with emission control regulations.

Another object of the present invention is to provide a more cost effective and efficient vapor recovery system of the type that incorporates the processes of solid bed adsorption and liquid hydrocarbon absorption.

Other objects, advantages and features of the present invention will become clear when the following description is read in conjunction with the accompanying drawing and appended claims.

DESCRIPTION OF THE INVENTION

It is to be understood that the present invention is not limited in application to the details of construction and arrangement of components described below and illustrated in the accompanying Figures. Also, it should be understood that various details of construction, such as various valving, vessel internals and control mechanisms, are not included or described herein as these will be clearly understood to persons of ordinary skill in the art and are considered unnecessary for completeness of the disclosure herein provided.

Figure 1:
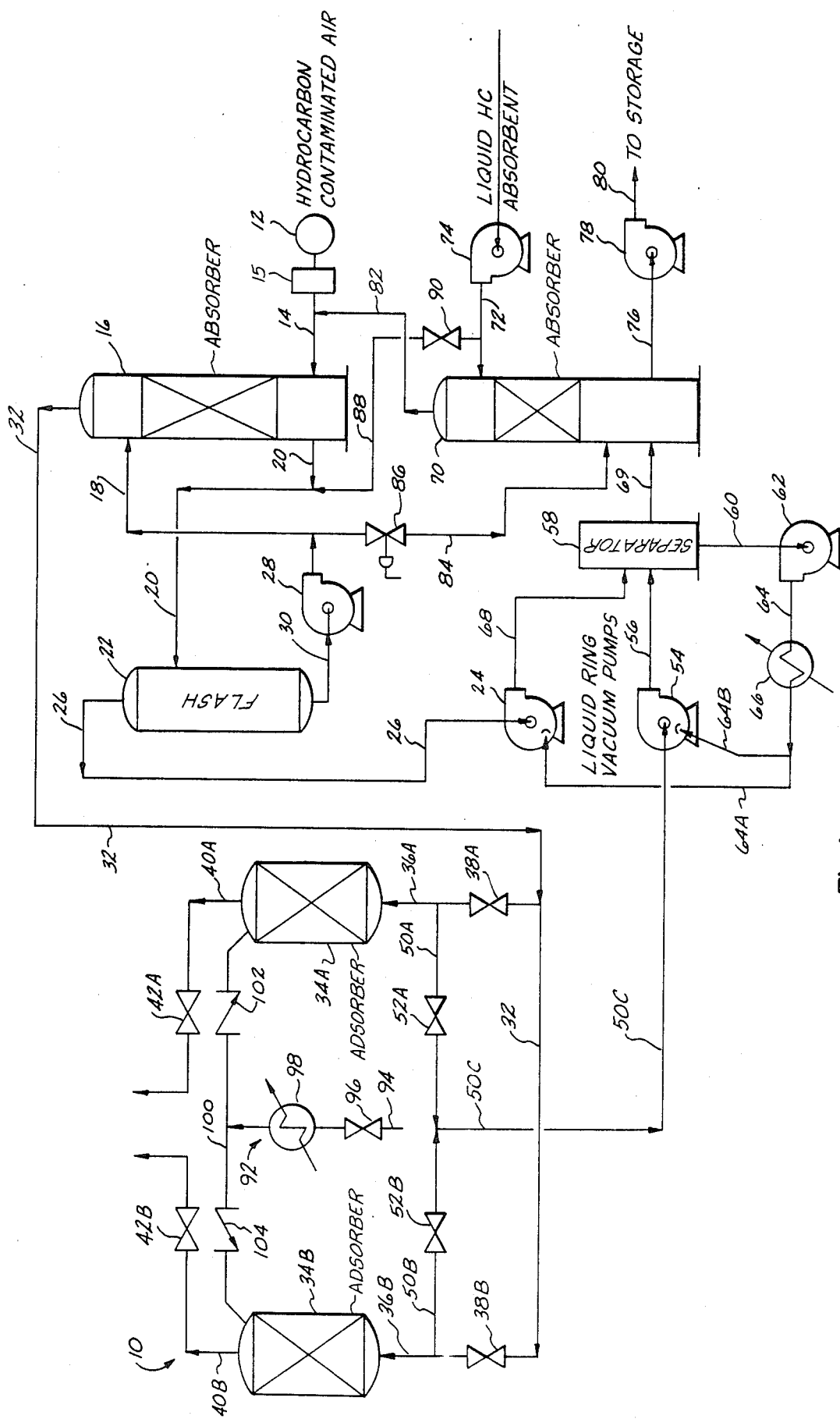
FIG. 1 is a flow diagram showing an absorption-adsorption-absorption vapor recovery system.

"Breathing" of a vessel containing hydrocarbons, or loading same with hydrocarbons, results in the expulsion of an air-hydrocarbon vapor mixture to the atmosphere. This is discussed adequately in McGill et. al., U.S. Pat. No. 4,066,423, so the mechanism of such need not be discussed further herein. With reference to the accompanying FIG. 1, depicted schematically therein is a vapor recovery system 10 which is connected to a source 12 of hydrocarbon contaminated air, such as that expelled from a storage tank or transporting vessel, via a conduit or line 14 to the lower portion of a first absorber vessel 16. The hydrocarbon vapors may be gasoline vapors, in which case the inlet line 14 will pass an air-gasoline vapor stream to the first absorber vessel 16. A conventional flame arrestor 15 can be provided in the inlet line 14 for such air-gasoline vapor stream. Since the present invention has been found to be especially useful in air-gasoline vapor recovery installations, and in order to more definitely distinguish the first absorber vessel 16 from the second absorber vessel described hereinbelow, the first absorber will sometimes be referred to as the "flashed hydrocarbon absorbent absorber" or the "flashed gasoline absorber".

A liquid hydrocarbon absorbent stream, also referred to and discussed more fully below as a flashed hydrocarbon absorbent or a flashed liquid gasoline absorbent, is fed to the top of the first absorber vessel 16 via a line 18. The first absorber vessel 16 is a conventional absorber operated near ambient temperature and slightly above atmospheric pressure and may be of either tray or packed tower design. In the first absorber vessel 16, the inlet air-gasoline vapor mixture from line 14 is passed in direct countercurrent contact with the downwardly cascading flashed liquid absorbent introduced at the upper portion of the first absorber vessel 16 via line 18 and the hydrocarbon components in the vapor are substantially absorbed. An enriched first absorber bottom liquid is withdrawn from the bottom of the first absorber vessel 16 through line 20 and passed to a flash vessel 22.

Flash vessel 22 is a conventional vessel which is operated at subatmospheric pressure, preferably between about 1.0 psi and 5.0 psi, via a first liquid ring vacuum pump 24 which draws the flash vapor from the flash vessel 22 via a line 26. The flash vessel 22 thus serves to regenerate the enriched absorber bottom liquid received from the first absorber vessel 16 by vacuum flashing same and producing a return stream of flashed absorbent which is pumped to the first absorber vessel 16 via a pump 28 withdrawing the flashed liquid gasoline via line 30 and discharging same to line 18.

Returning to the first absorber vessel 16, a first absorber overhead gas or vapor from the top thereof, comprising approximately twenty percent (20%) to thirty percent (30%) hydrocarbon by volume, passes by a line 32 to adsorbers described below. Thus, as discussed below, the composition of the first absorber overhead gas exiting the first absorber vessel 16 via the line 32 is controlled to be generally constant in hydrocarbon content.

The vapor recovery system 10 further comprises a battery of parallel first and second adsorber vessels 34A and 34B, only one of which is on stream at a time to perform its adsorbing function. A line 36A connects line 32 to the bottom of the first adsorber vessel 34A, and line 36B connects line 32 to the bottom of the second adsorber vessel 34B. A valve 38A is located in line 36A between the first adsorber vessel 34A and the line 32, and a valve 38B is located in line 36B between the second adsorber vessel 34B and the line 32. The adsorber vessels 34A, 34B are of conventional construction detail and contain beds of solid adsorbent material, typically activated carbon, capable of selectively adsorbing the hydrocarbon components from an air-hydrocarbon mixture.

A line 40A and a line 40B are connected to the upper ends of the first and second adsorber vessels 34A and 34B, respectively, with a pair of valves 42A and 42B, for venting to the atmosphere. While the valves 42A and 42B are depicted as check valves, it may be desirable to utilize control valves in lieu thereof and with conventionally disposed controls (not shown).

A line 50A is connected to the line 36A between the valve 38A and the first adsorber vessel 34A, and a line 50B is connected to the line 36B between the valve 38B and the second adsorber vessel 34B. The lines 50A and 50B connect to line 50C. Valves 52A and 52B are disposed, respectively, in lines 50A and 50B. Line 50C is connected to the suction port of a second liquid ring vacuum pump 54. The pump discharge is connected to a line 56 which is connected to a seal fluid-hydrocarbon separator 58.

The first absorber overhead gas from the first absorber vessel 16 is introduced at pressure slightly above atmospheric at about the temperature of the mixture source, which is normally about ambient, through line 32 to the lower portion of the first adsorber vessel 34A by opening the valve 38A and closing the valves 38B and 52A. As the air-hydrocarbon mixture flows through the solid adsorbent bed in the first adsorber vessel 34A, substantially all the hydrocarbon is adsorbed therefrom, and clean air is expelled from the top of the first adsorber vessel 34A through the line 40A.

Prior to reaching the saturation point of the adsorbent material in the first adsorber vessel 34A, the valves 38A and 52B are closed and valve 38B is opened to route the air-hydrocarbon mixture from line 32 through line 36B to the second adsorber vessel 34B for use during the regeneration of the solid adsorbent material contained in the first adsorber vessel 34A.

The liquid ring vacuum pump 54 is capable of producing near absolute vacuum in either of the adsorber vessels 34A, 34B for regeneration. During regeneration of the first adsorber 34A, the valve 52A is opened, and the vacuum produced by the pump 54 desorbs hydrocarbon from the solid adsorbent bed material contained in the first adsorber vessel 34A to produce a rich air-hydrocarbon mixture. As this air-hydrocarbon mixture comes in direct contact with pumping liquid used by the second liquid ring vacuum pump 54, cooling of the air-hydrocarbon mixture will occur, and a portion of the heavier hydrocarbon components therein may condense. Effluent from the pump 54 is directed to the separator 58 via the line 56. The separator vessel 58 is operated slightly above atmospheric pressure and is designed to separate the vapor and liquid components of the pump effluent and to further separate the liquid used by the liquid ring vacuum pump 54 from any recovered hydrocarbon liquid condensed by the inherent cooling action of the pump liquid ring vacuum pump 54. The liquid components of the pump effluent are separated in the lower portion of the separator 58 with the lighter hydrocarbon liquid rising to the top. The heavier pumping liquid, typically water and antifreeze, is withdrawn from the bottom of the separator 58 by a line 60 and pumped via pump 62 and line 64 through a cooler 66 back to the liquid side of the liquid ring vacuum pump 54. The cooler 66 is an indirect heat exchanger and may employ any suitable cooling medium.

Returning momentarily to the afore-mentioned flash vessel 22, the overhead flash vapor stream is drawn from the flash vessel 22 via line 26 to the first liquid ring vacuum pump 24. The effluent from the first liquid ring vacuum pump 24 is directed to the separator 58 via a line 68. The same liquid serves both the first and second liquid ring vacuum pumps 24, 54 and the liquid withdrawn from the bottom of the separator vessel 58 is pumped by pump 62 through line 64 into lines 64A and 64B which are respectively connected to the first and second liquid ring vacuum ring pumps 24 and 54.

An air-hydrocarbon effluent stream exits the separator vessel 58 via a line 69 and passes to a second absorber vessel 70. Vapor received from the separator 58 via line 69 rises in direct countercurrent contact with a liquid absorbent introduced at the upper portion of the second absorber vessel 70 via a line 72, and the hydrocarbon components in the vapor are substantially absorbed. The liquid absorbent fed to the second absorber vessel 70 via line 72 is an appropriate fresh liquid hydrocarbon absorbent, such as gasoline, pumped via a pump 74 through line 72; and the term "fresh" as used herein means that the liquid hydrocarbon absorbent is provided from a storage tank or other outside supply source of such liquid. A second absorber bottom liquid exits the bottom of the second absorber vessel 70 via a line 76 and is pumped to storage or other needed point via a pump 78 and a line 80. In order to distinguish the second absorber vessel 70 more clearly (from the first absorber vessel 16), the second absorber vessel 70 is also sometimes referred to as the "liquid hydrocarbon absorbent absorber" or the "gasoline absorber".

The second absorber vessel 70 may be of either tray or packed tower design, and in like manner to that discussed above for the first absorber vessel 16, is operated near ambient temperature and slightly above atmospheric pressure. The second absorber vessel 70 is preferably operated with a sufficiently high flow rate of liquid absorbent to feed gas ratio (L/V) to maintain a constant overhead vapor composition from the top of the second absorber vessel 70 regardless of the fluctuations in composition of the inlet feed rich air-hydrocarbon mixture in line 69.

The second absorber overhead vapor or gas exits the second absorber vessel 70 via a line 82 which connects to the line 14 which is the inlet feed line to the first absorber vessel 16. In this way the overhead vapor from the second absorber vessel 70 is combined with the inlet air-hydrocarbon vapors of line 14 and caused to pass therewith into the first absorber vessel 16 before passing via line 32 to the solid adsorbent beds of the first or second adsorber vessels 34A, 34B.

Returning briefly to the flash vessel 22, it will be remembered from the above discussion that the lean flashed liquid hydrocarbon absorbent is removed from the bottom of the flash vessel 22 via the pump 28. It may be necessary to bleed off an incremental part of the total volume, or system inventory, of this absorbent at some interval, or at some predetermined rate, as required to maintain a constant quantity of system inventory, or just to assure the prevention of contaminant buildup in the liquid absorbent. In practice, it is believed that the removal of about 1 gallon per minute will usually be sufficient for most installations. This is achieved via a line 84 which connects line 18 to the second absorber vessel 70. A valve 86 is disposed in the line 84 to control the absorbent removal rate, both in quantity and timing. The valve 86 can be a manual or controlled valve, providing the flash vessel with a liquid level control as necessary to maintain an appropriate amount of flashed liquid absorbent in the system. Makeup to the flashed liquid absorbent is achieved by a line 88 that connects the fresh hydrocarbon absorbent line 72 to the line 20 that leads to the flash vessel 22. A valve 90, disposed in the line 88, is normally closed if a manual valve is used, or if experience of makeup absorbent so requires, the valve 90 can be cracked open to permit incremental makeup of the removed absorbent. Of course, an orifice valve or a motor valve can also be used in lieu of the valve 90 if condition make such desirable. Also, the initial charge of absorbent to the system may be provided by opening the valve 90 to charge the system with an appropriate amount of liquid hydrocarbon to produce the system inventory of flashed absorbent. This initial charge of absorbent liquid to the flash vessel 22 can be liquid having an affinity to absorb the hydrocarbon components in the hydrocarbon contaminated air of the inlet stream.

In operation, the solid adsorbent bed in the second adsorber vessel 34B will commence to become saturated with adsorbed hydrocarbons removed from the air-hydrocarbon mixture flowing through it during the same time that the solid adsorbent bed in the first adsorber vessel 34A is being regenerated. In practice, the regeneration of the first adsorber vessel 34A will be completed in sufficient time to be placed on stream as the second adsorber vessel 34B is removed from service for vacuum regeneration. Preferably, the switch from the on stream to regeneration modes of the second adsorber vessel 34B will occur prior to complete saturation. Valves 38B and 52A are closed and the valve 38A is opened to route the air-hydrocarbon mixture from line 32 through line 36A to the first adsorber vessel 34A for use during regeneration of the second adsorber vessel 34B. Simultaneously, valve 52B is opened to connect the second adsorber vessel 34B to line 50C which is connected to the suction port of the second liquid ring vacuum pump 54. As hydrocarbon free air is discharged from the second adsorber vessel 34B the valve 42B will open, and the valve 42A will close, so that the exhausting air will exit via line 40B to the atmosphere.

In practice, in addition to the above described details of the vapor recovery system 10 of FIG. 1, the first and second adsorber vessels 34A and 34B may be provided with an air inlet system 92 for admitting atmospheric air via a line 94, a valve 96, a heater 98, and a line 100 which connects to the top portions of the first and second adsorber vessels 34A, 34B. Valves 102 and 104, typically check valves, are disposed in line 100 as shown. This permits the selective admission of atmospheric air to the adsorber vessels as may be required for regeneration, and if desired, the air can be heated by the heater 98. For example, during a portion of the regeneration time of the first adsorber vessel 34A, the valves 96 and 102 are opened, and the valve 104 is closed, providing a heated air stream to the solid adsorbent bed in the first adsorber vessel 34A. As is known, the admission of air, whether heated or at ambient temperature, is useful in removing the buildup of heavier hydrocarbons, often referred to as "heel", during a portion of the regeneration cycle.

The maintenance of a sufficiently high L/V mole ratio in the second absorber vessel 70 to achieve constant overhead gas composition is usually desirable, and in some applications such may be required, as the only fluctuations to the first absorber vessel 16 will be from that of the inlet air-hydrocarbon stream from the source 12. The on stream adsorber will thus see a more constant or controlled inlet condition as it relates to hydrocarbon composition, permitting the establishment of proper adsorption capacity availability regardless of inlet vapor fluctuations. In the present invention, the discharge vapor load of the second absorber vessel 70, which services the regeneration pull off vapor of the adsorber vessels 34A, 34B, is passed through the first absorber vessel 16 after combining same with the inlet air-hydrocarbon vapor stream and before it passes through one of the solid adsorbent beds of the first and second adsorber vessels 34A, 34B. The first absorber vessel 16 uses a lean flashed absorbent as it is constantly fed vacuum flashed hydrocarbon liquid from the flash vessel 22, leading to a reduction in the vapor hydrocarbon concentration prior to entry of the vapor into the solid adsorbent bed of the on-line first or second adsorber vessels 34A, 34B. This makes possible a very significant reduction in size of the solid adsorbent bed in the adsorber vessels 34A, 34B since the hydrocarbon concentration of the first absorber overhead gas is reduced even when the hydrocarbon concentration of the inlet air-gasoline stream in line 14 increases greatly. In fact, it is believed that the present invention will increase the capacity of any vapor recovery system used in commercial recovery of gasoline vapors in truck loading service, including those employing adsorption, by as much as forty percent (40%). With regard to existing vapor recovery installations, such systems can be increased in capacity a like amount by modifying those installations to practice the present inventive process.

With further regard to the novel use of an entry absorber vessel 70 as taught by the process illustrated in FIG. 1, it will be noted that this absorber operates with internally generated absorbent. The flashing that occurs in the flash vessel 22 will cool the absorbent by as much as 10 degrees Fahrenheit to 30 degrees Fahrenheit for gasoline vapors. Thus, the generation of a vacuum flashed hydrocarbon absorbent will serve to cool the absorbent, providing the absorber vessel 70 with a continuing source of cooled, lean liquid hydrocarbon absorbent. Additionally, the passage of the inlet air-hydrocarbon vapors through the absorber vessel 70 upstream to the adsorber vessels 34A, 34B provides the further benefit of capturing potentially deleterious contaminants that may be in the inlet air-hydrocarbon vapor stream.

In the above described process for the removal of hydrocarbon components from an air-hydrocarbon mixture, heat of adsorption is generated during the adsorbing cycle. In most cases, the heat of adsorption does not result in appreciable heat build-up in the adsorbent beds of the adsorber vessels 34A, 34B for the reason that the exhausted hydrocarbon free air removes at least a portion of the heat generated, and the external surfaces of the adsorbent bed vessel serve to radiate a portion of the heat generated. However, heat build-up can be a problem in certain adsorption systems, especially during shut down. An example is activated carbon adsorption of ketones which sometimes are present in vapor recovery operations. In a carbon adsorption bed idle with ketones adsorbed on the carbon in the presence of air, a slow oxidation can occur which is exothermic. If this reaction occurs during the adsorption cycle, the heat generated by such oxidation will usually not be a factor in the operating conditions of the adsorbent bed, but if the oxidation reaction occurs during bed idlement as stated, the dissipation of the thermal energy generated by the exothermic reaction can become a problem. The reason for this is that carbon is a very good thermal insulating material, and the heat released by the oxidation reaction does not tend to be dissipated through the external walls of the vessel. Rather, local zones of high temperature can occur, causing the whole mass of the adsorbent bed to rise in temperature. As the temperature rises, the rate of oxidation increases and a type of boot-strap situation occurs in which the higher the temperature rises the greater the rate of oxidation. Once commenced, the oxidation of the hydrcarbons on the carbon can drive the bed temperature to a level which can result in a carbon bed fire unless the temperature of the bed is controlled by a temperature limiting system.

While some prior art teachings have suggested the placement of cooling coils in carbon adsorbent beds, such cooling devices have functional capability only during circulation of a cooling medium and do not insure against temperature excursions during bed idlement with no power available to circulate the cooling medium. Experience has shown that the best approach to such undesirable temperature excursions is care in controlling the composition of inlet vapor streams to avoid the admission of harmful substances such as the afore-mentioned ketones. The inventive process illustrated in FIG. 1 assists in contaminant control by the removal of many such unwanted constituents in the first absorber vessel 70 which serves in effect as an initial filtering mechanism to protect the solid adsorbent beds of the adsorber vessels 34A, 34B from harmful intrusions.

Figure 2:
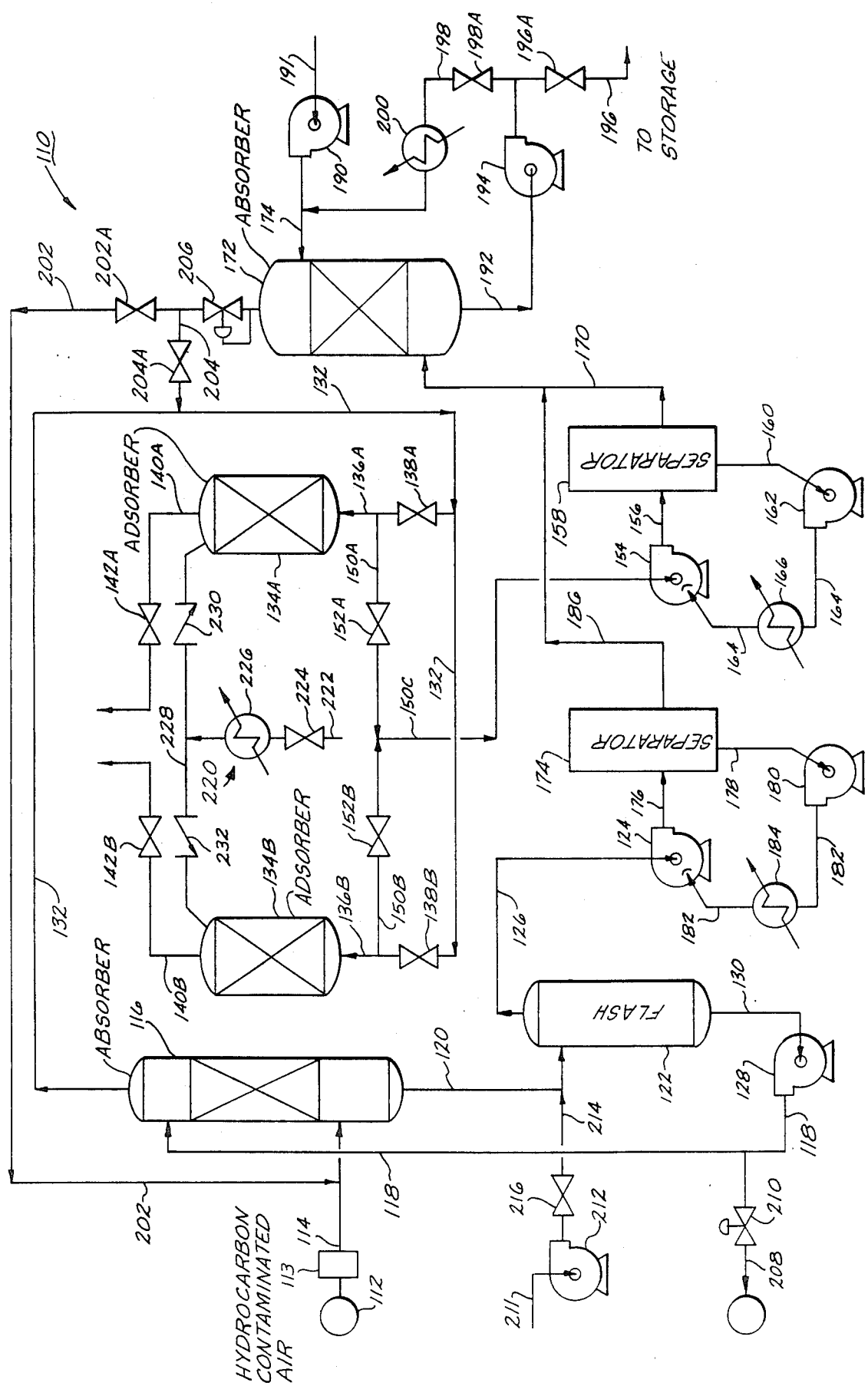
FIG. 2 is a flow diagram showing a second embodiment of an absorption-adsorption-absorption vapor recovery system.

Referring now to FIG. 2, depicted schematically therein is a vapor recovery system 110 which is connected to a source 112 of hydrocarbon contaminated air, such as that expelled from a storage tank or transporting vessel, passes through a flame arrestor 113 to a line 114 and to the lower portion of an inlet absorber vessel 116. In order to distinguish the absorber 116 from the second absorber described hereinafter, the first absorber vessel 116 can be referred to as the flashed hydrocarbon absorbent absorber, or where the source 112 provides gasoline vapors, the inlet absorber can also be referred to as the flashed gasoline absorber.

A liquid hydrocarbon absorbent stream, is fed to the top of the absorber 116 via a line 118. The absorber 116 is a conventional absorber operated near ambient temperature at slightly above atmospheric pressure and may be of either tray or packed tower design. In the absorber 116, the vapor mixture from line 114 is passed in countercurrent contact with the downwardly cascading absorbent introduced at the upper portion of the first absorber vessel 116 via line 118, and the hydrocarbon components in the vapor are substantially absorbed. An absorber bottom liquid is withdrawn from the bottom of the first absorber vessel 116 through line 120 and passed to a flash vessel 122.

Flash vessel 122 is a conventional vessel which is operated at subatmospheric pressure, preferably between about 1.0 psi and 5.0 psi, via a first liquid ring vacuum pump 124 which draws the flash vapor from the flash vessel 122 via a line 126. The flash vessel 122 serves to regenerate the enriched absorber bottom liquid received from the absorber vessel 116 by vacuum flashing same and producing a return stream of flashed absorbent which is pumped to the absorber 116 via a pump 128 withdrawing the flashed liquid gasoline via line 130 and discharging same to line 118.

Returning to the absorber vessel 116, a first absorber overhead gas or vapor from the top thereof, comprising approximately 20% to 30% hydrocarbon by volume, passes by a line 132 to adsorber vessels described below. The composition of the first absorber overhead gas exiting the first absorber vessel 116 via the line 132 will be generally constant in this hydrocarbon content range.

The vapor recovery system 110 further comprises a battery of parallel first and second adsorber vessels 134A and 134B, only one of which is on stream at a time to perform its adsorbing function. A line 136A connects line 132 to the bottom of the first adsorber vessel 134A, and line 136B connects line 132 to the bottom of the second adsorber vessel 134B. A valve 138A is located in line 136A between the first absorber vessel 134A and the line 132, and a valve 138B is located in line 136B between the second absorber vessel 134B and the line 132. The adsorber vessels 134A, 134B are of conventional construction detail and contain beds of solid adsorbent material, typically activated carbon, capable of selectively adsorbing the hydrocarbon components from the air-hydrocarbon mixture.

A line 140A and a line 140B are connected to the upper ends of the first and second adsorber vessels 134A and 134B, respectively, with valves 142A and 142B provided in these lines as shown, for venting to the atmosphere. As above, these valves can be check valves or control valves. A line 150A is connected to the line 136A between the valve 138A and the first adsorber vessel 134A, and a line 150B is connected to the line 136B between the valve 138B and the second adsorber vessel 134B. The lines 150A and 150B connect to line 150C. Valves 152A and 152B are disposed, respectively, in lines 150A and 150B. Line 150C is connected to the suction port of a liquid ring vacuum pump 154. The pump discharge is connected to a line 156 which is connected to a seal fluid-hydrocarbon separator 158.

The absorber overhead gas from the inlet absorber vessel 116 is introduced at slightly above atmospheric pressure and at about the temperature of the mixture source, which is normally about ambient, through line 132 to the lower portion of the first adsorber vessel 134A by opening the valve 138A and closing the valves 138B and 152A. As the air-hydrocarbon mixture flows through the solid adsorbent bed in the first adsorber vessel 134A, substantially all hydrocarbon components are adsorbed therefrom, and clean air is expelled from the top of the first adsorber vessel 134A through the line 140A and valve 142A. Prior to reaching the saturation point of the adsorbent material in the first adsorber vessel 134A, the valves 138A and 152B are closed and the valve 138B is opened to route the air-hydrocarbon mixture from line 132 through line 136B to the second adsorber vessel 134B for use during the regeneration of the solid adsorbent material contained in the first adsorber vessel 134A.

The liquid ring vacuum pump 154 is capable of producing near absolute vacuum in either of the adsorber vessels 134A, 134B for regeneration. During regeneration of the first adsorber vessel 134A, the valve 152A is opened, and the vacuum produced by the liquid ring vacuum pump 154 desorbs hydrocarbon from the solid adsorbent bed material contained in the first adsorber vessel 134A to produce a rich air-hydrocarbon mixture. As this air-hydrocarbon mixture comes in direct contact with pumping liquid used by the liquid ring vacuum pump 154, cooling of the air-hydrocarbon mixture will occur and a portion of the heavier hydrocarbon components may condense. Effluent from the liquid ring pump 154 is directed to the separator vessel 158 via the line 156. The separator vessel 158 is operated slightly above atmospheric pressure and is designed to recover the liquid of the liquid ring vacuum pump 154 from recovered hydrocarbon liquid or vapor. The pump liquid and hydrocarbon liquid are separated in the separator vessel 158 with the lighter hydrocarbon liquid rising to the top, and the pumping liquid, typically water and antifreeze, is withdrawn from the bottom of the separator 158 by a line 160 and pumped via pump 162 and line 164 through a cooler 166 back to the liquid side of the liquid ring vacuum pump 154. The cooler 166 is an indirect heat exchanger and may employ any suitable cooling medium. Recovered liquid hydrocarbon and air-hydrocarbon vapor effluent exit the separator 158 via a line 170 that passes to the bottom of an absorber 172. The air and vapors received from the separator 158 via line 170 rise in direct countercurrent contact with a liquid hydrocarbon absorbent introduced at the upper portion of the absorber 172 via a line 174, and the hydrocarbon components in the vapor are substantially absorbed.

Returning momentarily to the afore-mentioned flash vessel 122, the overhead flash vapor stream is drawn from the flash vessel 122 via line 126 to the liquid ring vacuum pump 124. The effluent from the liquid ring vacuum pump 124 is directed to a separator vessel 174 via line 176. The separator 174, which is similar to the separator 158, is operated slightly above atmospheric pressure and is designed to separate the pump effluent and to recover the liquid of the liquid ring pump 124. The pump liquid and hydrocarbon liquid are separated in the separator vessel 174 with the lighter hydrocarbon liquid rising to the top, and the heavier pumping liquid, typically water and antifreeze, is withdrawn from the bottom of the separator 174 by a line 178 and pumped via pump 180 and line 182 through a cooler 184 back to the liquid side of the liquid ring vacuum pump 124. The cooler 184 is an indirect heat exchanger and may employ any suitable cooling medium. Recovered liquid hydrocarbon and air-hydrocarbon vapor effluent exit the separator 174 via a line 186 and is combined with the effluent stream in line 170 exiting the separator 158 such that the combined effluent streams pass to the absorber 172 so that the hydrocarbon vapor and air pass in countercurrent contact with the liquid hydrocarbon absorbent in the absorber 172. The hydrocarbon liquid from the line 170 joins the hydrocarbon absorbent as it collects in the bottom of the absorber 172. Although not shown, appropriate valves, including check valves, can be disposed in lines 170 and 186 as required.

The liquid absorbent fed to the absorber 172 via line 174 can be fresh hydrocarbon, such as gasoline, pumped via a pump 190, which is connected to a source of same via line 191. Also, a portion of the bottom liquid from the absorber 172, withdrawn via a line 192, can be used as the overhead absorbent to the absorber 172, or this bottom liquid can be combined in any desired proportion with the fresh absorbent supplied by pump 190. As above, the term "fresh" as used herein means that the gasoline or other liquid hydrocarbon absorbent is provided from a storage tank or other outside supply source of such liquid.

The absorber bottom liquid, which is recovered hydrocarbon liquid plus the liquid absorbent fed to the top of the absorber 172, is withdrawn via line 192 and is pumped by a pump 194 through a line 196 to storage, or via a line 198 through a cooler 200 to the line 174 and then to the upper portion of the absorber 172. Valves 196A and 198A are disposed in the lines 196 and 198 for selective routing of the bottom liquid from the absorber 172.

In order to distinguish the absorber 172, it may also be referred to as the liquid hydrocarbon absorbent absorber or the second gasoline absorber. The absorber 172 may be of either tray or packed tower design, and in like manner to that discussed above for the absorber 116, is operated near ambient temperature and slightly above atmospheric pressure. The absorber 172 is preferably operated with a sufficiently high flow rate of liquid hydrocarbon absorbent to feed gas ratio (L/V) to maintain a constant overhead vapor composition from the top of the absorber 172 regardless of the fluctuations in composition of the inlet feed rich air-hydrocarbon mixture in line 170.

Absorber overhead vapor or gas exits the absorber 172 via a line 202 which connects to the line 114 which carries the overhead gas or vapor to the inlet absorber 116. An alternative to this is provided by a line 204 which connects line 202 to line 132. Valves 202A and 204A are provided in lines 202 and 204 as shown. With valve 204A closed and valve 202A open the overhead air and vapors from the absorber 172 will pass via line 202 to the inlet absorber 116. With valve 202A closed and valve 204A open, the overhead air and vapors from the absorber 172 will pass to line 132 to be combined with the overhead air and vapors from the inlet absorber 116 and caused to pass therewith to the solid adsorbent beds of the first and second adsorber vessels 134A, 134B. Further, in order to increase the efficiency of the absorber 172, it may be desirable to incorporate a pressure control valve 206 in line 202 so as to maintain the pressure in the absorber 172 greater than the vapor pressure of the liquid absorbent.

Returning briefly to the flash vessel 122, it will be remembered from the above discussion that the lean flashed liquid hydrocarbon absorbent is removed from the bottom of the flash vessel 122 via the pump 128. It may be necessary to remove an incremental part of the total system inventory of this absorbent at some interval, or at some predetermined rate, to maintain a constant quantity of absorbent inventory, or just to prevent the buildup of deleterious substances. In practice, it is suggested that about 1 gallon per minute is usually sufficient for most commercial systems. This is achieved via a drain line 208 which connects to line 118 which leads to the inlet absorber 116. A valve 210 is disposed in the line 208 to control the drain off rate, both in quantity and timing. While the valve 210 can be a manual valve, it is preferable to provide a control valve in the line 208 and to provide the flash vessel 122 a liquid level controller (not shown) to open and close valve 210 as necessary to maintain an appropriate amount of flashed liquid hydrocarbon absorbent in the system.

Makeup to the flashed liquid absorbent is provided by a line 211 from a source of liquid hydrocarbon absorbent, such as fresh gasoline, to a pump 212 which is connected via a line 214 to the line 120 that leads to the flash vessel 122. A valve 216, disposed in the line 214, is normally closed if a manual valve is used, or if experience of makeup absorbent so requires, the valve 216 can be cracked open to permit incremental makeup. Of course, the valve 216 can be an orifice valve or a motor valve if conditions make such desirable. Also, the initial charge of absorbent to the flash vessel 122 may be provided by opening the valve 216 to charge the system with an appropriate amount of liquid hydrocarbon to produce the system inventory of flashed absorbent, and this initial inventory charge of absorbent liquid to the flash vessel 122 can be achieved with the use of any liquid having an affinity to absorb the hydrocarbon components in the hydrocarbon contaminated air of the inlet stream.

In operation, the solid adsorbent bed in the second adsorber vessel 134B will commence to become saturated with hydrocarbons adsorbed from the air-hydrocarbon mixture flowing through it during the same time that the solid adsorbent bed in the first adsorber vessel 134A is being regenerated. In practice, the regeneration of the first adsorber vessel 134A will be completed in sufficient time to be placed on stream as the second adsorber vessel 134B is removed from service for vacuum regeneration. Preferably, the switch from the on stream mode to the regeneration mode of the second adsorber vessel 134B will occur prior to complete saturation. Valves 138B and 152A are closed and the valve 138A is opened to route the air-hydrocarbon mixture from line 132 through line 136A to the first adsorber vessel 134A for use during regeneration of the second adsorber vessel 134B. Simultaneously, valve 152B is opened to connect the second adsorber vessel 134B to line 150C which is connected to the suction port of the second liquid ring vacuum pump 154. As hydrocarbon free air is discharged from the second adsorber vessel 134B the valve 142B will open, so that the exhausting air will exit via line 140B to the atmosphere.

In practice, in addition to the above described details of the vapor recovery system 110 of FIG. 2, the first and second adsorber vessels 134A and 134B may be provided with an air inlet system 220 for admitting atmospheric air via a line 222, a valve 224, a heater 226, and a line 228 which connects to the top portions of the first and second adsorber vessels 134A, 134B. Valves 230 and 232 (typically check valves, but control valves may also be provided), are disposed in line 228 as shown. This permits the selective admission of atmospheric air to the adsorber vessels 134A, 134B as may be required for regeneration, and if desired, the air can be heated by the heater 226. For example, during a portion of the regeneration time of the first adsorber vessel 134A, the valves 222 and 230 are opened, and the valve 232 is closed, providing a heated air stream to the solid adsorbent bed in the first adsorber vessel 134A. Of course, with the closure of valve 230 and opening of valve 232, the air will be routed to the second absorber vessel 134B as required during its regeneration. As is known, the admission of air, whether heated or at ambient temperature is useful in removing the buildup of heavier hydrocarbons, often referred to as "heel", during a portion of the regeneration cycle.

It is usually desirable that the L/V mole ratio in the absorbers 116 and 172 be maintained sufficiently high to achieve constant overhead gas composition, and in some applications this may be important, as the only fluctuations to the absorber 116 will be from that of the inlet air-hydrocarbon stream from the source 112 and the flashed absorbent from the flash vessel 112. The adsorber vessels 134A and 134B will thus see a more constant or controlled inlet condition as it relates to hydrocarbon composition, permitting the establishment of proper adsorption capacity availability regardless of inlet vapor fluctuations.

Referring back to FIG. 1, that figure shows the use of a single separator vessel 58 for two vacuum pumps 24 and 54. In FIG. 2, the use of separate separator vessels 158 and 174 for the vacuum pumps 154 and 124 is shown. In practice, the use of a common separator vessel or individual separator vessels is not a unique requirement for either figure and the separator scheme selected will depend on each application.

Figure 3:
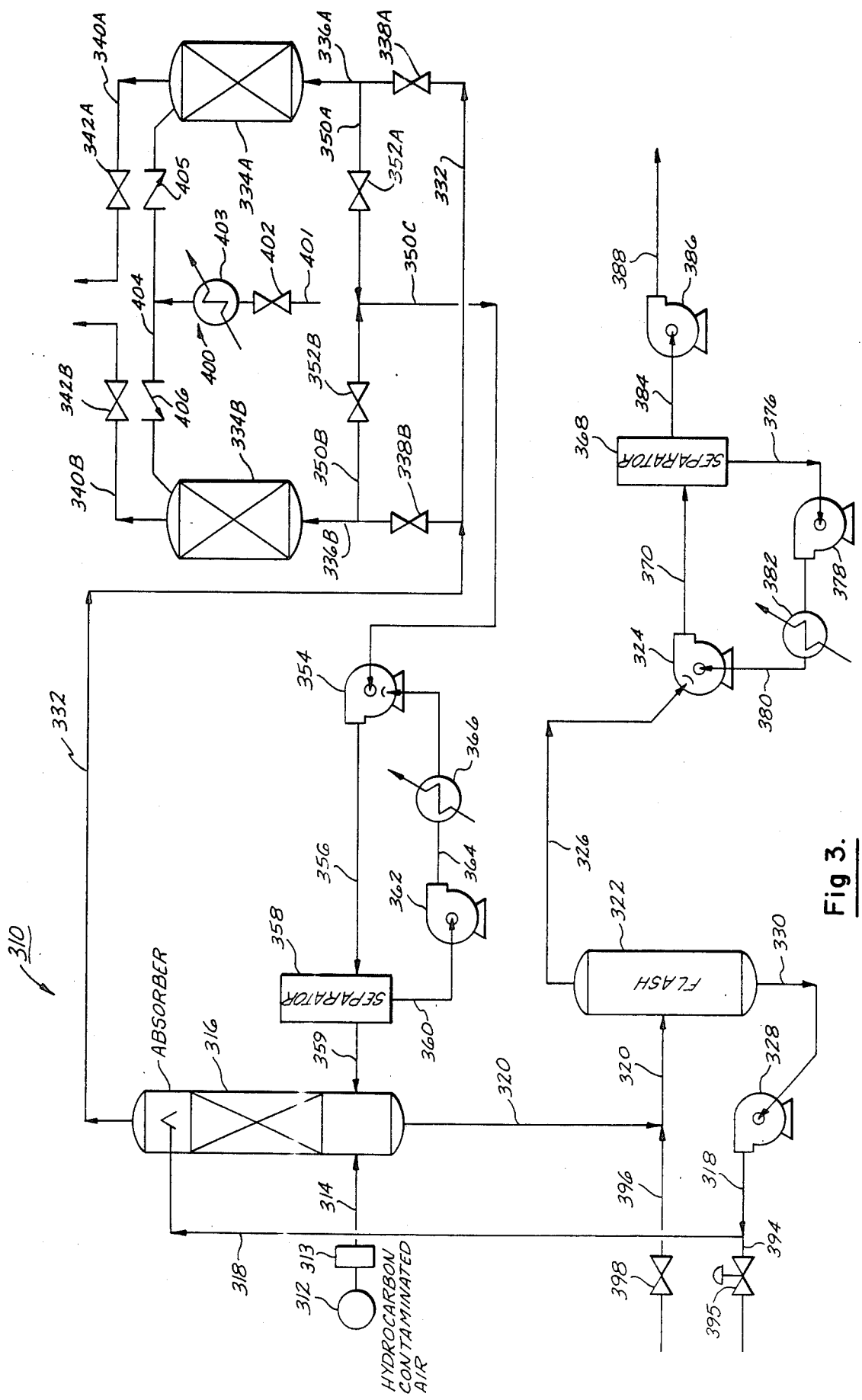
FIG. 3 is a flow diagram showing an absorption-adsorption vapor recovery system.

Referring now to FIG. 3 of the drawings, depicted schematically therein is a vapor recovery system 310 which receives a source 312 of hydrocarbon contaminated air, such as that expelled from a storage tank or transporting vessel, which passes through a flame arrestor 313 to a line 314 to the lower portion of an inlet absorber vessel 316. As discussed above, the hydrocarbon vapors can be gasoline vapors, in which case inlet line 314 feeds an air-gasoline vapor stream to the inlet absorber 316, also referred to as the flashed hydrocarbon absorbent absorber or the flashed gasoline absorber.

A liquid hydrocarbon absorbent stream, also referred to as a flashed hydrocarbon or gasoline absorbent, is fed to the top of the absorber 316 via a line 318. The absorber 316 is a conventional absorber vessel operated near ambient temperature and slightly above atmospheric pressure and may be of either tray or packed tower design. In the absorber 316, the inlet air-hydrocarbon vapor mixture from line 314 is passed in countercurrent contact with the downwardly cascading flashed liquid absorbent introduced at the upper portion of the absorber 316 via line 318, and the hydrocarbon components in the vapor are substantially absorbed. An enriched absorber bottom liquid is withdrawn from the bottom of the absorber 316 by a line 320 and passed to a flash vessel 322.

Flash vessel 322 is a conventional vessel which is operated at subatmospheric pressure, preferably between about 1.0 psi and 5.0 psi, via a first liquid ring vacuum pump 324 which draws the flash vapor from the flash vessel 322 via a line 326. The flash vessel 322 thus serves to regenerate the enriched absorber bottom liquid received from the absorber 316 by vacuum flashing same and producing a return stream of flashed absorbent which is pumped to the absorber 316 via a pump 328 withdrawing the flashed liquid gasoline via line 330 and discharging same to line 318.

Returning to the absorber 316, an absorber overhead gas or vapor from the top thereof, comprising approximately 20% to 30% hydrocarbon by volume, passes by a line 332 to adsobers described below. Thus, as discussed below, the composition of the absorber overhead gas exiting the absorber 316 via the line 332 is maintained generally constant in hydrocarbon content.

The vapor recovery system 310 further comprises a battery of parallel first and second adsorber vessels 334A and 334B, only one of which is on stream at a time to perform its adsorbing function. A line 336A connects line 332 to the bottom of the first adsorber vessel 334A, and line 336B connects line 332 to the bottom of the second adsorber vessel 334B. A valve 338A is located in lie 336A between the first adsorber vessel 334A and the line 332, and a valve 338B is located in line 336B between the second adsorber vessel 334B and the line 332. The adsorber vessels 334A, 334B are of conventional construction detail and contain beds of solid adsorbent material, typically activated carbon, capable of selectively adsorbing the hydrocarbon components from an air-hydrocarbon mixture.

A line 340A and a line 340B are connected to the upper ends of the first and second adsorber vessels 334A and 334B, respectively, for exiting the vapors to the atmosphere, and values 342A and 342B (typically check valves or motor valves) are provided in these lines respectively. The lines 340A and 340B are used to vent the hydrocarbon free air normally to the atmosphere via lines 344A and 344B. A line 350A is connected to the lines 336A between the valve 338A and the first adsorber vessel 334A, and a line 350B is connected to the line 336B between the valve 338B and the second adsorber vessel 334B. The lines 350A and 350B connect to line 350C. Valves 352A and 352B are disposed, respectively, in lines 350A and 350B. Line 350C is connected to the suction port of a second liquid ring vacuum pump 354. The pump discharge of the liquid ring vacuum pump 354 is connected to a line 356 which is connected to a separator 358.

The absorber overhead gas from the absorber 316 is introduced at pressure slightly above atmospheric at about the temperature of the mixture source, which is normally about ambient, through line 332 to the lower portion of the first absorber vessel 334A by opening the valve 338A and closing the valves 338B and 352A. As the air-hydrocarbon mixture flows through the solid adsorbent bed in the first adsorber vessel 334A, substantially all the hydrocarbon is adsorbed therefrom, and clean air is expelled from the top of the first adsorber vessel 334A through the line 340A and valve 342A. Prior to reaching the saturation point of the adsorbent material in the first adsorber vessel 334A, the valves 338A and 352B are closed and the valve 338B is opened to route the air-hydrocarbon mixture from line 332 through line 336B to the second adsorber vessel 334B for use during the regeneration of the solid adsorbent material contained in the first adsorber vessel 334A.

The liquid ring vacuum pump 354 is capable of producing near absolute vacuum in either of the adsorber vessels 334A, 334B for regeneration. During regeneration of the first adsorber 334A, the valve 352A is opened, and the vacuum produced by the liquid ring vacuum pump 354 desorbs hydrocarbon from the solid adsorbent bed material contained in the first adsorber vessel 334A to produce a rich air-hydrocarbon mixture. As this air-hydrocarbon mixture comes in direct contact with pumping liquid used by the liquid ring vacuum pump 354, cooling of the air-hydrocarbon mixture will occur, and a portion of the heavier hydrocarbon components therein will condense. Effluent from the liquid ring vacuum pump 354 is directed to the separator 358 via the line 356. The separator vessel 358 is operated slightly above atmospheric pressure and is designed to separate the vapor and any recovered hydrocarbon liquid condensed by the inherent cooling action of the liquid ring vacuum pump 354 of the pump effluent from the liquid used by the liquid ring pump 354. The liquid components of the pump effluent are separated in the separator 358 with the lighter hydrocarbon liquid rising to the top. The heavier pumping liquid, typically water and antifreeze, is withdrawn from the bottom of the separator 358 by a line 360 and pumped via pump 362 and line 364 through a cooler 366 back to the liquid side of the liquid ring vacuum pump 354. The cooler 366 is an indirect heat exchanger and may employ any suitable cooling medium.

A liquid hydrocarbon and an air-hydrocarbon vapor stream exit the separator 358 via a line 359 and passes to the absorber 316. the vapor portion of the effluent stream received from the separator 358 via line 359 rises in direct countercurrent contact with the liquid hydrocarbon absorbent introduced at the upper portion of the absorber 316 via the line 318, and the liquid hydrocarbon received from line 359 joins the collected absorbent in the bottom of the absorber 316.

Returning momentarily to the afore-mentioned flash vessel 322, the overhead flash vapor stream is drawn from the flash vessel 322 through line 326 by the liquid ring vacuum pump 324. The effluent from the liquid ring vacuum pump 324 is directed to a second separator 368 via a line 370. The heavier pumping liquid, typically water and antifreeze, is withdrawn from the bottom of the separator 368 by a line 376 and pumped via a pump 378 and line 380 through a cooler 382 back to the liquid side of the liquid ring vacuum pump 324. The cooler 382 is an indirect heat exchanger and may employ any suitable cooling medium.

The hydrocarbon effluent stream is removed from the separator vessel 368 via line 384, a pump 386 and a line 388. The effluent is comprised of seal fluid, hydrocarbon vapor and hydrocarbon liquid which may be condensed by the inherent cooling action of the liquid ring vacuum pump 324. The vapor from the separator 368 is virtually 100% hydrocarbon. It can be recovered by a number of physical processes including, chilling, compression, absorption or direct contact condensation. The method selected for recovery will depend upon the application and can be easily selected by those skilled and knowledgeable in the art.

Returning briefly to the flash vessel 322, it will be remembered from the above discussion that the lean flashed liquid hydrocarbon absorbent is removed from the bottom of the flash vessel 322 via the line 330 and the pump 328. It may be necessary to drain an incremental part of the total volume, or system inventory, of this absorbent at some interval, or at some predetermined rate, as required to maintain a constant quantity of system inventory, or just to negate a buildup of deleterious substances. In practice, it is believed that about 1 gallon per minute will usually be sufficient for most commercial systems. This is achieved via a drain line 394 connected to the line 318 which passes absorbent to the absorber 316. A value 395 is disposed in the line 394 to control the drain rate, both in quantity and timing. While the valve 395 can be a manual valve, it is preferable to provide it as a control valve in line 394 and to provide a flash vessel with a liquid level controller (not shown) to open and close valve 395 as necessary to maintain an appropriate amount of flashed liquid hydrocarbon absorbent in the system.

Makeup to the flashed liquid hydrocarbon absorbent is achieved by a line 396 that connects a source of fresh hydrocarbon liquid to the line 320 that leads to the flash vessel 322. A valve 398, disposed in the line 396, is normally closed if a manual valve is used, or if experience of makeup absorbent so requires, the valve 398 can be cracked open to permit incremental makeup of the drain. Of course, an orifice valve or a control valve can also be used as the valve 398 if conditions make such desirable. Also, the initial charge of absorbent to the system can be provided by opening the valve 398 to charge the system with an appropriate amount of liquid hydrocarbon, such as gasoline, to produce the system inventory of flashed absorbent. As mentioned above, the initial inventory charge of absorbent liquid to the flash vessel 322 can be achieved with any liquid having an affinity to absorb the hydrocarbon components in the hydrocarbon contaminated air of the inlet vapor stream.

In operation, the solid adsorbent bed in the second adsorber vessel 334B will commence to become saturated with hydrocarbons adsorbed from the air-hydrocarbon mixture flowing through it during the same time that the solid adsorbent bed in the first adsorber vessel 334A is being regenerated. In practice, the regeneration of the first adsorber vessel 334A will be completed in sufficient time to be placed on stream as the second adsorber is removed from service for vacuum regeneration. Preferably, the switch from the one stream mode to the regeneration mode of the second adsorber vessel 334B will occur prior to complete saturation. Valves 338B and 352A are closed and the valve 338A is opened to route the air-hydrocarbon mixture from line 332 through line 336A to the first adsorber vessel 334A for use during regeneration of the second adsorber vessel 334B. Simultaneously, valve 352B is opened to connect the second adsorber vessel 334B to line 350C which is connected to the suction port of the second liquid ring vacuum pump 354. As hydrocarbon free air is discharged from the second adsorber vessel 334B the valve 342B will open, and the valve 342A will close, so that the exhausting air will exit via line 340B to the atmosphere.

In practice, in addition to the above described details of the vapor recovery system 310 of FIG. 3, the first and second adsorber vessels 334A and 334B may be provided with an air inlet system 400 for admitting atmospheric air via a line 401, a valve 402, a heater 403, and a line 404 which connects to the top portions of the first and second adsorber vessels 334A, 334B. Valves 405 and 406 are disposed in line 404 as shown. This permits the selective admission of atmospheric air to the adsorber vessels as may be required for regeneration, and if desired, the air can be heated by the heater 403. For example, during a portion of the regeneration time of the first adsorber vessel 334A, the valves 402 and 405 are opened, and the valve 406 is closed, providing a heated air stream to the solid adsorbent bed in the first adsorber vessel 334A. As is known, the admission of air, whether heated or at ambient temperature, is useful in removing the buildup of heavier hydrocarbons, often referred to as "heel", during a portion of the regeneration cycle.

It is desirable to maintain a sufficiently high L/V mole ratio in the absorber 316 to achieve constant overhead gas composition, and in some applications may be necessary, as the fluctuations of the inlet air-hydrocarbon stream from the source 312 and the recovered liquid hydrocarbon components from the separator vessel 358 will be minimized as the one stream adsorber will see a more constant or controlled inlet condition relative to the inlet hydrocarbon composition, permitting a better establishment of proper adsorption capacity availability for a wide range of hydrocarbon content in the inlet air-hydrocarbon stream.

With further regard of the system 310 taught by the present invention, it will be noted that the absorber 316 operates with internally generated absorbent. The flashing that occurs in the flash vessel 322 will cool the absorbent by as much as 10 to 30 degrees Fahrenheit. That is, the generation of vacuum flashed hydrocarbon absorbent serves to cool the absorbent, providing the absorber vessel 316 with a continuing source of cooled, lean liquid absorbent.

Additionally, as discussed hereinabove, the passage of the inlet air-hydrocarbon vapors through the absorber 316 upstream to the adsorbers 334A, 334B provides the added benefit of capturing potentially deleterious constituents that may be in the inlet air-hydrocarbon vapor stream. The heat of adsorption generated during the adsorbing cycle does not result in appreciable heat buildup for the reason that the exhausted hydrocarbon free air removes a portion of the heat generated, and the external surfaces of the adsorbent bed vessels serve to radiate part of the heat generated. However, heat buildup due to ketone oxidation, or the like, during bed idlement can be a problem for carbon adsorption beds, as discussed, and the inlet absorber 316 of the present invention serves to entrap and remove such potentially deleterious substances.

Figure 4:
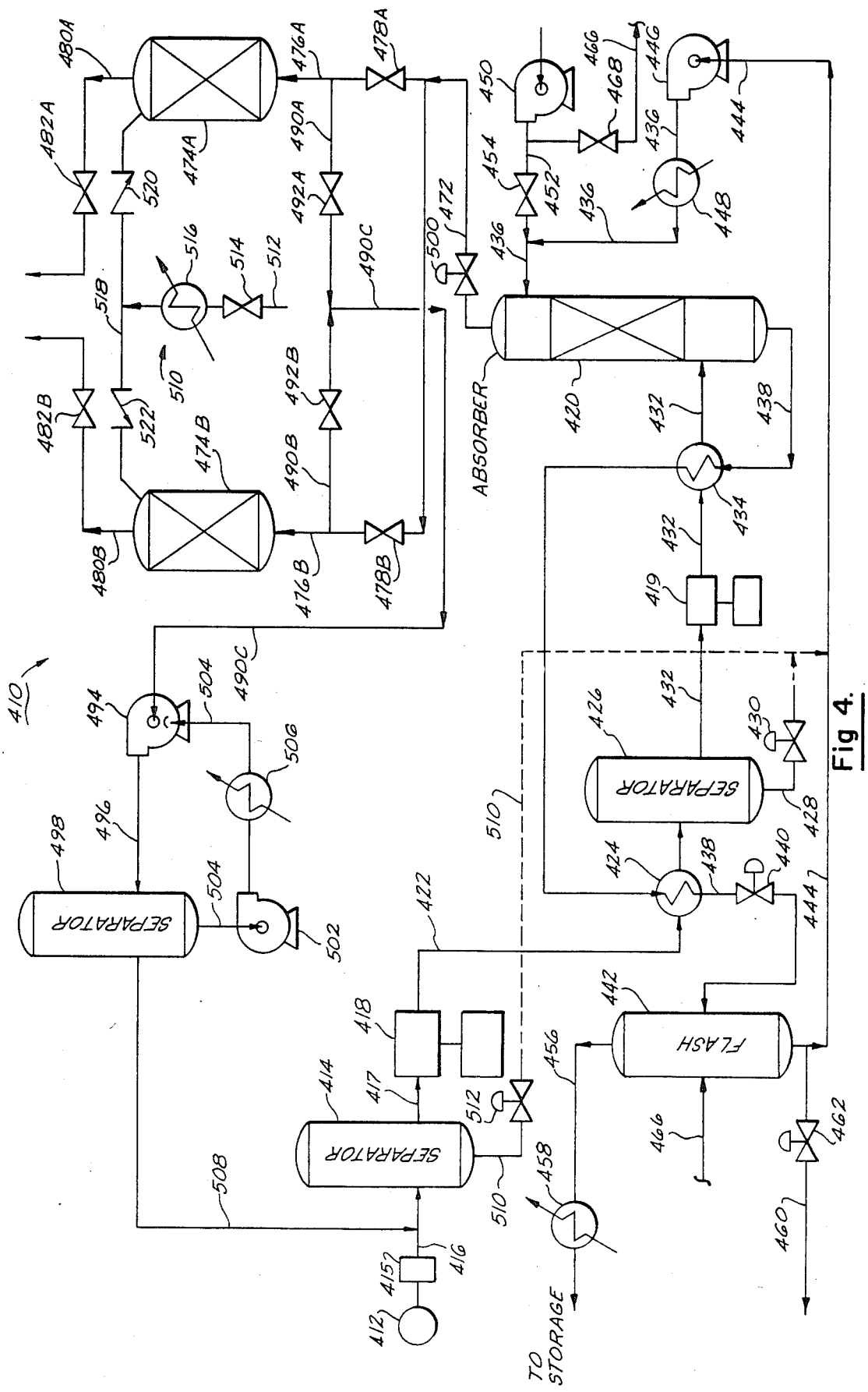
FIG. 4 is a flow diagram showing a compression-absorption-adsorption vapor recovery system.

Referring now to FIG. 4, depicted schematically therein is a vapor recovery system 410 for recovery of hydrocarbon vapors from a hydrocarbon contaminated air stream employing compression of the stream in combination with absorption-adsorption. A source 412 of hydrocarbon contaminated air, such as that expelled from a storage tank or transporting vessel, is passed to an inlet separator 414 (which serves as a liquid knock out vessel) via a flame arrestor 415 and an inlet line or conduit 416. Any liquid content of the inlet air-hydrocarbon stream in line 416 is trapped in the bottom of the separator 414, and the air-vapor portion passes via line 417 to a first compressor 418.

The first compressor 418, in combination with a second compressor 419, provides two stage compression of the air-hydrocarbon vapor stream prior to its entry into an absorber vessel 420. The use of multiple stage compression of hydrocarbon vapors is well known in the art, and no further discussion of same is deemed necessary to understand the compressors 418, 419 in the vapor recovery system 410, except for the operating conditions of these compressors. While two compression stages are illustrated in this disclosure, it will be understood that a single stage or more than two stages may be required in a particular application, and the selection of the number of such compression stages will be within the skill of one possessing ordinary skill in this art.

The hydrocarbon vapors are compressed in the first compressor 418 to a pressure of from about 1 to about 10 atmospheres so as to condense to liquid such components as heavy hydrocarbons and water present in the air-hydrocarbon stream. The compressed air-hydrocarbon stream passes from the first compressor 418 via a line 422, through a first cooler 424, to a liquid-vapor separator vessel 426 for separation of the condensed liquid components of the compressed air-hydrocarbon stream from the compressed vapors thereof. A line 428 connects to the bottom of the separator 426, and a valve 430 is located in the line 428 so that the condensed liquid components can be removed from the system for storage or use elsewhere. While the valve 430 can be a manual or an orifice valve, it is preferable to provide a control valve in the line 428 and to provide the separator 426 with a liquid level controller (not shown) to open and close the valve 430 as necessary to remove the separated liquids from the compressed stream.

The compressed air-hydrocarbon stream is passed from the separator 426 to the second compressor 419 via a line 432 where the compressed hydrocarbon vapor stream is further compressed to a pressure of from about 10 to about 20 atmospheres. As previously stated, the second compressor 419 represents the second stage of the two stage compression of the air-hydrocarbon vapor stream prior to its introduction into the absorber 420. The compressed air-hydrocarbon stream is passed via line 432 through a second cooler 434 and to the bottom portion of the absorber 420 such that the compressed air-hydrocarbon stream is passed in direct countercurrent contact with a downwardly cascading flashed liquid hydrocarbon absorbent introduced at the upper portion of the absorber 420 via a line 436. The absorber 420, a conventional absorber operated near ambient temperature and at an elevated pressure (for example, at a pressure of from about 150 to about 200 psi), may be of either the tray or packed tower design. An enriched absorber bottom liquid is withdrawn from the bottom of the absorber 420 through a ling 438, and passed through the coolers 434, 424 to a flash vessel 442. A pressure control valve 440 is interposed in the line 438 between the cooler 424 and the flash vessel 442.

The flash vessel 442, which is operated at ambient pressure and at an elevated temperature, is a conventional flash vessel and serves to regenerate the enriched absorber bottom liquid recieved from the absorber 420 by flashing same to produce a return stream of flashed absorbent. This flashed absorbent is removed from the flash vessel 442 via a line 444 and a pump 446 which discharges to a line 436, the flashed absorbent passing through a cooler 448 en route to the absorber 420. The initial charge of absorbent to the system 410 may be fresh gasoline, or other appropriate fresh liquid hydrocarbon absorbent, pumped via a pump 450 through line 452 and valve 454 to the lie 436 from a storage tank or other outside supply source of such liquid.

The overhead vapor stream of the flash vessel 442 passes via a line 456 through a cooler 458 to storage or use elsewhere. As previously stated, the lean flashed liquid hydrocarbon absorbent is removed from the bottom of the flash vessel 442 via the line 444 and the pump 446. It may be necessary to drain an incremental part of the total volume, or system inventory, of this absorbent at some interval, or at some predetermined rate, as required to maintain a constant quantity of system inventory, or just to assure the prevention of deleterious substance buildup. In practice, it is believed that removal of about 1 gallon per minute will usually be sufficient for most commercial systems. This is achieved via a drain line 460 which connects to line 444 from the flash vessel 442. A valve 462 is disposed in the line 460 to control the drain rate, both in quantity and timing. While the valve 462 can be a manual valve, it is preferable to provide a control valve in the line 460 and to provide the flash vessel 442 with a liquid level controller (not shown) to open and close the valve 462 as necessary to maintain an appropriate amount of flashed liquid absorbent in the system.

Makeup to the flashed liquid absorbent can be achieved by the pump 450 via a line 466 that connects to the discharge line 452 thereof. A valve 468, disposed in the line 466, is normally closed if a manual valve is used, or if experience of makeup absorbent so requires, the valve 468 can be cracked open to permit incremental makeup. Of course, an orifice valve or a control valve can also be used as the valve 468 if conditions make such desirable.

Returning to the absorber 420, an absorber overhead gas or vapor from the top thereof passes by a line 472 to adsorbers described below. Thus, as discussed below, the composition of the absorber overhead gas exiting the absorber vessel 420 via the line 472 is maintained generally constant in hydrocarbon content.

The vapor recovery system 410 further comprises a battery of parallel first and second adsorber vessels 474A and 474B only one of which is on stream at a time to perform its adsorbing function. A line 476A connects line 472 to the bottom of the first adsorber vessel 474A, and line 476B connects line 472 to the bottom of the second adsorber vessel 474B. A valve 478A is located in line 476A between the first adsorber vessel 474A and the line 472, and a valve 478B is located in line 476B between the second adsorber vessel 474B and the line 472. The adsorber vessels 474A, 474B are of conventional construction detail and contain beds of solid adsorbent material, typically activated carbon, capable of selectively adsorbing the hydrocarbon components from an air-hydrocarbon mixture.

A line 480A and a line 480B are connected to the upper ends of the first and second adsorber vessels 474A and 474B, respectively, for exhausting air to the atmosphere with a pair of valves 482A and 482B (typically check valves or control valves) as shown. A line 490A is connected to the line 476A between the valve 478A and the first adsorber vessel 474A, and a line 490B is connected to the line 476B between the valve 478B and the second adsorber vessel 474B. The lines 490A and 490B connect to line 490C. Valves 492A and 492B are disposed, respectively, in lines 490A and 490B. Line 490C is connected to the suction port of a liquid ring vacuum pump 494. The pump discharge is connected to a line 496 which is connected to a liquid vapor separator vessel 498.

The absorber overhead gas stream from the absorber vessel 420 passes through line 472 to the lower portion of the first adsorber vessel 474A by opening the valve 478A and closing the valves 478B and 492A. A pressure control valve 500 is disposed in line 472 to assure pressure maintenance in the absorber 420. As the air-hydrocarbon mixture flows through the solid adsorbent bed in the first adsorber vessel 474A, substantially all the hydrocarbon is adsorbed therefrom, and clean air is expelled from the top of the first adsorber vessel 474A through the line 480A and the valve 482A normally to the atmosphere. Prior to reaching the saturation point of the adsorbent material in the first adsorber vessel 474A, the valves 478A and 478B are closed and the valve 478B is opened to route the air-hydrocarbon mixture from line 472 through line 476B to the second adsorber vessel 474B for use during the regeneration of the solid adsorbent material contained in the first adsorber vessel 474B.

The liquid ring vacuum pump 494 is capable of producing near absolute vacuum in either of the adsorber vessels 474A, 474B for regeneration. During regeneration of the first adsorber vessel 474A, the valve 492A is opened, and the vacuum produced by the liquid ring vaccum pump 494 desorbs hydrocarbon from the solid adsorbent bed in the first adsorber vessel 474A to produce a rich air-hydrocarbon mixture. As this air-hydrocarbon mixture comes in direct contact with pumping liquid used by the liquid ring vacuum pump 494, cooling of the air-hydrocarbon mixture will occur, and a portion of the heavier hydrocarbon components therein will condense. Effluent from the liquid ring vacuum pump 494 is directed to the liquid separator vessel 498 via the line 496.

The separator vessel 498 is operated at slightly above atmospheric pressure and designed to separate the hydrocarbon vapor and liquid components from the liquid used by the liquid ring vacuum pump 494. The pump liquid so separated is pumped via a pump 502 and line 504 through a cooler 506 back to the liquid side of the liquid ring vacuum pump 494. The cooler 506 is an indirect heat exchanger and may employ any suitable cooling medium. An effluent stream containing recovered hydrocarbons and air exits the separator vessel 498 through a line 508 which connects to line 416 which leads to the inlet separator 414. The bottom liquids collected in the inlet separator 414 are removed via a line 510, and as the dash line indicates, may join the line 428 (from the bottom of separator 426) to connect to the line 444 (which passes the flashed absorbent from the flash vessel 442 to the pump 446 en route to the absorber 420). A valve 512, preferably a liquid level controlled valve, is disposed in the line 510.

In operation, the solid adsorbent bed in the second adsorber vessel 474B will commence to become saturated from the air-hydrocarbon mixture flowing through it during the same time that the solid adsorbent bed in the first adsorber vessel 474A is being regenerated. In practice, the regeneration of the first adsorber vessel 474A will be completed in sufficient time to be placed on stream as the second adsorber vessel 474B is removed from service for vacuum regeneration. Preferably, the switch from the on stream mode to the regeneration mode of the second adsorber vessel 474A will occur prior to complete saturation. Valves 478B and 492A are closed and the valve 478A is opened to route the air-hydrocarbon mixture from line 472 through line 476A to the first adsorber vessel 474A for use during regeneration of the second adsorber vessel 474B. Simultaneously, valve 492B is opened to connect the second adsorber vessel 474B to line 490C which is connect to the suction port of the liquid ring vacuum pump 494. Hydrocarbons free air is then discharged from the first adsorber vessel 474A via line 480A to the atmosphere.

In practice, in addition to the above described details of the vapor recovery system 410 of FIG. 4, the first and second adsorber vessels 474A and 474B may be provided with an air inlet system 510 for admitting atmospheric air via a line 512, a valve 514, a heater 516, and a line 518 which connects to the top portions of the first and second adsorber vessels 474A, 474B. Valves 520 and 522 are disposed in line 518 as shown. This permits the selective admission of atmospheric air to the adsorber vessels as may be required for regeneration, and if desired, the air can be heated by the heater 516. For example, during a portion of the regeneration time of the first adsorber vessel 474A, the valves 514 and 520 are opened, and the valve 522 is closed, providing a heated air stream to the solid adsorbent bed in the first adsorber vessel 474A.

As discussed hereinabove, the L/V mole ratio in the absorber 420 is maintained sufficiently high to achieve constant overhead gas composition so that the outlet vapor stream from the absorber 420 will be relatively consistent in its hydrocarbon content. Thus, the adsorber vessel 474A and 474B will see a more constant or controlled inlet hydrocarbon composition, permitting better design for proper adsorption capacity regardless of inlet vapor fluctuations from the source 412 of hydrocarbon vapors.

It is clear that the present invention is well adapted to carry out the objects and to attain the ends and advantages mentioned as well as those inherent therein. While presently preferred embodiments have been described for purposes of this disclosure, numerous changes may be made which will readily suggest themselves to those skilled in the art and which are encompassed within the spirit of the invention disclosed and as defined in the appended claims.

What is claimed is:

1. In a process in which hydrocarbon components are removed from an inlet air-hydrocarbon mixture by passing the inlet air-hydrocarbon mixture through solid adsorbent beds capable of selectively adsorbing hydrocarbon components from the inlet air-hydrocarbon mixture, and in which the adsorbent beds are vacuum regenerated to produce a rich air hydrocarbon mixture which is passed to an absorber in which a substantial portion of the hydrocarbon components are absorbed from the rich air-hydrocarbon mixture by a liquid hydrocarbon absorbent to produce an absorber overhead gas containing nonabsorbed hydrocarbon components, the improvement comprising:
    (a) passing the inlet air-hydrocarbon mixture through a first absorber vessel to produce an absorber overhead gas stream and an absorber bottom liquid stream;
    (b) passing the absorber bottom liquid stream to a flash vessel to flash the absorber bottom liquid stream to produce an overhead flash vapor stream and a flashed liquid stream having an affinity to absorb hydrocarbons from the inlet air-hydrocarbon mixture;
    (c) passing the flashed liquid stream from the flash vessel to the absorber vessel such that the inlet air-hydrocarbon stream is directed through the absorber vessel in direct countercurrent contact with the flashed liquid stream;
    (d) passing the overhead flash vapor stream from the flash vessel to another absorber vessel such that the overhead flash vapor stream is directed through the other absorber vessel in direct countercurrent contact with a liquid absorbent stream to produce another absorber overhead stream and another absorber bottom liquid stream; and,
    (e) passing the combined absorber overhead gas streams from the absorbers to a selected one of the solid adsorbent beds for adsorbing substantially all of the hydrocarbon components in the absorber overhead gas stream.

2. The improvement of claim 1 comprising the step of:
    (f) passing at least a portion of the bottom liquid stream of the absorber vessel in step (d) to an upper portion of this absorber vesel as at least a portion of the absorbent stream thereto.

3. The improvement of claim 1 wherein the air-hydrocarbon mixture comprises air-gasoline vapors and wherein the liquid absorbent is gasoline.

4. The improvement of claim 1 further comprising:
    (e) ceasing the flow of the combined absorber overhead gas streams to the selected solid adsorbent bed and diverting the flow to a second solid adsorbent bed when the first selected bed has become substantially hydrocarbon laden;
    (f) subjecting the hydrocarbon laden solid adsorbent bed to a first liquid ring vacuum pump to desorb the adsorbed hydrocarbon components therefrom so as to produce a rich first air-hydrocarbon mixture;
    (g) passing the rich first air-hydrocarbon mixture to a first separator vessel to separate a hydrocarbon-air vapor stream and a pump liquid stream;
    (h) passing the recovered air-hydrocarbon stream to the second absorber vessel; and,
    (i) recycling the separated pump liquid stream to the first liquid ring vacuum pump.

5. The improvement of claim 4 further comprising:
    (j) cooling the separated pump liquid stream recovered from the first separator vessel in step (g) prior to recycling same to the first liquid ring vacuum pump in step (i).

6. The improvement of claim 5 further comprising:
    (k) subjecting the vapor stream from the flash vessel to a second liquid ring vacuum pump;
    (l) passing the second liquid ring pump effluent to a second separator vessel to separate a pump liquid stream and a hydrocarbon stream;
    (m) passing the hydrocarbon stream from the second separator vessel with the hydrocarbon stream from the first separator vessel to the second absorber vessel for adsorption contact therein; and,
    (n) recycling the pump liquid stream separated in the second separator vessel in step (l) to the second liquid ring vacuum pump.

7. The improvement of claim 6 further comprising:
    removing an incremental part of the flashed liquid stream from the process inventory of flashed absorbent; and,
    adding an amount of liquid hydrocarbon absorbent as required to maintain a desired system inventory of flashed absorbent.

8. The improvement of claim 7 wherein a subatmospheric pressure of between about 1.0 and about 5.0 psia is maintained in the flash vessel by the first liquid ring vacuum pump.

9. The improvement of claim 8 wherein the air-hydrocarbon mixture comprises air-gasoline vapors and wherein the liquid hydrocarbon absorbent is gasoline.

10. In a process in which hydrocarbon components are removed from an inlet air-hydrocarbon mixture by passing the inlet air-hydrocarbon mixture through solid adsorbent beds capable of selectively adsorbing hydrocarbon components from the inlet air-hydrocarbon mixture to exhaust substantially hydrocarbon free air, and in which the adsorbent beds are vacuum regenerated to produce a rich air hydrocarbon mixture which is passed to an absorber in which a substantial portion of the hydrocarbon components are absorbed from the rich air-hydrocarbon mixture by a liquid hydrocarbon absorbent to produce an absorber overhead gas containing nonabsorbed hydrocarbon components, the improvement comprising:

(a) passing the inlet air-hydrocarbon mixture through an absorber vessel in which an absorber overhead gas stream and an absorber bottom liquid stream are produced;

(b) passing the absorber bottom liquid stream to a flash vessel to produce an overhead flash vapor stream and a flashed liquid stream having an affinity to absorb hydrocarbons from the inlet air-hydrocarbon mixture;

(c) passing the flashed liquid stream from the flash vessel to the absorber vessel such that the inlet air-hydrocarbon stream is passed in absorbing contact with the flashed liquid stream; and, (d) passing the absorber overhead gas stream from the absorber vessel to a selected one of the solid adsorbent beds for adsorbing substantially all of the hydrocarbon components in the absorber overhead gas stream.

11. The improvement of claim 10 wherein the air-hydrocarbon mixture comprises air-gasoline vapors and wherein the liquid absorbent is gasoline.

12. The improvement of claim 10 further comprising:

(e) passing the overhead flash vapor stream from the flash vessel to a separator vessel by a liquid ring vacuum pump in which hydrocarbon components and pump liquid used by the liquid ring vacuum pump are separated;

(f) cooling the separated pump liquid withdrawn from the separator vessel; and recycling the separated pump liquid from the first separator vessel to the liquid ring vacuum pump.

13. The improvement of claim 10 further comprising:

(g) changing the flow of the absorber overhead gas stream in step (d) from the first selected solid adsorbent bed to a second adsorbent bed when the first selected bed has become substantially hydrocarbon laden;

(h) subjecting the hydrocarbon laden first solid adsorbent bed to a liquid ring vacuum pump to desorb the adsorbed hydrocarbon components therefrom so as to produce a rich air-hydrocarbon mixture;

(i) passing the air-hydrocarbon mixture through another separator vessel to separate the desorbed hydrocarbons from the liquid used by the liquid ring vacuum pump;

(j) passing the recovered hydrocarbons in step (i) to another absorber vessel in which an hydrocarbon absorbent absorbingly contacts the vapor portion of the recovered hydrocarbons to substantially absorb same; and, (k) recycling the separated pump liquid in step (i) to the liquid ring vacuum pump of step (h).

14. The improvement of claim 13 further comprising the step of:

(l) passing a portion of the flashed liquid stream of step (b) to the absorber vessel in step (j) for use as at least a portion of the hydrocarbon absorbent used therein.

15. The improvement of claim 13 further comprising:

(m) cooling the recycled pump liquid from the separator vessel of step (i) prior to passing same to the liquid ring vacuum pump in step (h).

16. In a process in which hydrocarbon components are removed from an inlet air-hydrocarbon mixture by passing the inlet air-hydrocarbon mixture through solid adsorbent beds capable of selectively adsorbing hydrocarbon components from the inlet air-hydrocarbon mixture to exhaust substantially hydrocarbon free air, and in which the adsorbent beds are vacuum regenerated to produce a rich air hydrocarbon mixture which is passed to an absorber in which a substantial portion of the hydrocarbon components are absorbed from the rich air-hydrocarbon mixture with a liquid hydrocarbon absorbent to produce an absorber overhead gas containing nonabsorbed hydrocarbon components, the improvement comprising:

compressing the inlet air-hydrocarbon mixture to partially condense components from the air-hydrocarbon mixture and effecting separation of the condensed liquid components from a vapor phase;

contacting the compressed vapor phase with a hydrocarbon absorbent in an absorber vessel to produce an overhead vapor stream and a bottom liquid stream;

passing the overhead vapor stream from the absorber vessel to the solid adsorbent beds for adsorbing substantially all of the hydrocarbon components in the overhead vapor stream;

flashing the bottom liquid stream from the absorber vessel in a flash vessel to produce an overhead flash vapor stream and a flashed liquid stream; and, passing the flashed liquid stream from the flash vessel to the absorber vessel to serve as the hydrocarbon absorbent therein so that the compressed vapor stream of the inlet air-hydrocarbon mixture is contacted by the flashed liquid stream.

17. The improvement of claim 16 wherein compressing the inlet air-hydrocarbon vapor stream comprises:

passing the air-hydrocarbon vapor stream to a first compressor wherein the air-hydrocarbon vapor stream is compressed at a pressure of from about 1 to about 10 atmospheres to compress the air-hydrocarbon vapor stream and provide the condensed liquid hydrocarbon components and the compressed vapor phase;

passing the compressed air-hydrocarbon vapor stream to a separator vessel to effect separation of the condensed liquid components and the compressed vapor phase; and, passing the compressed vapor phase through a second compressor to further compress the vapor phase at a pressure of from about 1 to about 20 atmospheres.

18. The improvement of claim 17 further comprising:

passing the compressed air-hydrocarbon vapor stream through a first cooler prior to introduction of the compressed air-hydrocarbon vapor stream into the separator vessel; and, passing the separated compressed vapor stream exiting the second compressor through a second cooler prior to introduction of same into the absorber vessel.

19. The improvement of claim 18 further comprising:

passing the bottom liquid stream from the absorber vessel through the first and second coolers and into the flash vessel.

20. The improvement of claim 19 further comprising:

subjecting the hydrocarbon laden solid adsorbent bed to a vacuum pump to desorb the adsorbed hydrocarbon components therefrom so as to produce a rich air-hydrocarbon mixture;

passing the rich air-hydrocarbon mixture through a second separator vessel to effectively separate an air-hydrocarbon vapor phase and a pump liquid phase;

combining the air-hydrocarbon vapor phase recovered from the second separator with inlet air-hydrocarbon mixture; and, recycling the separated pump liquid to the liquid ring vacuum pump.

21. The improvement of claim 20 further comprising:

cooling the separated aqueous liquid recovered from the second separator vessel prior to recycling same for use in the liquid ring vacuum pump.

22. The improvement of claim 21 further comprising:

draining an incremental part of the flashed absorbent stream; and, adding an amount of the liquid hydrocarbon absorbent as required to maintain a desired system inventory of same.

23. The improvement of claim 16 wherein the inlet air-hydrocarbon mixture comprises air-gasoline vapors and wherein the liquid hydrocarbon absorbent is gasoline.

* * * * *

UNITED STATES PATENT AND TRADEMARK OFFICE
CERTIFICATE OF CORRECTION

PATENT NO. : 4,715,868

DATED : December 29, 1987

INVENTOR(S) : Paul E. Kennedy

It is certified that error appears in the above-identified patent and that said Letters Patent is hereby corrected as shown below:

On the cover sheet, under Section [57] ABSTRACT, line 6, the words "absorbent bed" should read --adsorbent bed--. In column 1, line 15, the word "the" should read --The--. In column 17, line 26, the word "the" should read --The--. In column 20, line 47, the word "recieved" should read --received--. In column 22, line 59, the word "connect" should read --connected--. In claim 2, column 24, line 7, the word "vesel" should read --vessel--.

Signed and Sealed this

Sixth Day of September, 1988

Attest:

DONALD J. QUIGG

*Attesting Officer*  *Commissioner of Patents and Trademarks*